United States Patent
Wu et al.

(10) Patent No.: US 9,599,830 B2
(45) Date of Patent: Mar. 21, 2017

(54) LIGHT SOURCE MODULE, DISPLAY APPARATUS AND METHOD FOR DRIVING LIGHT SOURCE MODULE

(71) Applicants: Jhong-Hao Wu, Hsin-Chu (TW); Chin-Ku Liu, Hsin-Chu (TW)

(72) Inventors: Jhong-Hao Wu, Hsin-Chu (TW); Chin-Ku Liu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 18 days.

(21) Appl. No.: 14/298,972

(22) Filed: Jun. 9, 2014

(65) Prior Publication Data
US 2014/0375707 A1 Dec. 25, 2014

(30) Foreign Application Priority Data
Jun. 19, 2013 (CN) .......................... 2013 1 0243996

(51) Int. Cl.
*G02B 27/22* (2006.01)
*F21V 7/04* (2006.01)
(Continued)

(52) U.S. Cl.
CPC ....... *G02B 27/2228* (2013.01); *G02B 6/0035* (2013.01); *G02B 6/0038* (2013.01);
(Continued)

(58) Field of Classification Search
None
See application file for complete search history.

(56) References Cited

U.S. PATENT DOCUMENTS 6,129,444 A * 10/2000 Tognoni ............... G02B 6/0068
362/231
6,836,368 B2 * 12/2004 Niida ................... G02B 6/0031
359/619
(Continued)

FOREIGN PATENT DOCUMENTS

CN 1011576215 11/2009
CN 102074203 5/2011
(Continued)

OTHER PUBLICATIONS

"Office Action of China Counterpart Application", issued on Jun. 28, 2016, p. 1-p. 5, in which the listed references were cited.

*Primary Examiner* — Dismery Mercedes
(74) *Attorney, Agent, or Firm* — Jianq Chyun IP Office

(57) ABSTRACT

A light source module adapted to provide a first illumination beam to a display apparatus is provided. The display apparatus includes a display panel for displaying a 2D/3D image. The light source module includes a first wedge-shaped light guide plate, a first light emitting device, a second light emitting device, and a light source driving module. The first wedge-shaped light guide plate has a first and second light incident surfaces and an optical grating pattern. The first light emitting device and the second light emitting device are respectively disposed beside the first light incident surface and the second light incident surface. In a 2D/3D image display mode, the light source driving module controls to turn on the first/second light emitting device for providing the first illumination beam to the first wedge-shaped light guide plate. A method for driving the display apparatus is also provided.

27 Claims, 15 Drawing Sheets

(51) Int. Cl.
*G09G 3/00* (2006.01)
*G09G 3/34* (2006.01)
*H04N 13/00* (2006.01)
*H04N 13/04* (2006.01)
*F21V 8/00* (2006.01)
*G09G 3/36* (2006.01)

(52) U.S. Cl.
CPC ......... *G02B 6/0046* (2013.01); *G02B 6/0068* (2013.01); *G02B 6/0076* (2013.01); *G02B 27/2214* (2013.01); *G09G 3/003* (2013.01); *G09G 3/3406* (2013.01); *H04N 13/00* (2013.01); *H04N 13/0418* (2013.01); *H04N 13/0452* (2013.01); *G09G 3/3611* (2013.01)

(56) References Cited

U.S. PATENT DOCUMENTS

| | | | | |
|---|---|---|---|---|
| 7,364,343 | B2* | 4/2008 | Keuper | G02B 6/0046 362/615 |
| 8,033,706 | B1* | 10/2011 | Kelly | G02B 6/0036 362/307 |
| 8,189,973 | B2 | 5/2012 | Travis et al. | |
| 8,351,744 | B2* | 1/2013 | Travis | G02B 5/045 362/610 |
| 8,721,153 | B2* | 5/2014 | Kinder | G02B 5/045 349/65 |
| 8,976,235 | B2* | 3/2015 | Yun | G02B 3/06 348/59 |
| 9,007,296 | B2* | 4/2015 | Lee | G09G 3/36 345/102 |
| 2008/0043490 | A1* | 2/2008 | Coleman | G02B 6/0036 362/623 |
| 2008/0117231 | A1* | 5/2008 | Kimpe | G09G 3/20 345/629 |
| 2009/0091667 | A1* | 4/2009 | Schultz | G02B 27/2214 349/15 |
| 2009/0316072 | A1* | 12/2009 | Okumura | G02B 5/021 349/64 |
| 2011/0157167 | A1* | 6/2011 | Bennett | G06F 3/14 345/419 |
| 2011/0187635 | A1* | 8/2011 | Lee | G09G 3/36 345/102 |
| 2011/0242441 | A1* | 10/2011 | Minami | G02B 5/0215 349/15 |
| 2011/0304784 | A1* | 12/2011 | Hirota | G02B 6/0046 349/15 |
| 2012/0105767 | A1* | 5/2012 | Choi | G02B 6/0038 349/62 |
| 2012/0242931 | A1* | 9/2012 | Jung | G02F 1/13363 349/62 |
| 2012/0287037 | A1* | 11/2012 | Shikii | G02B 6/0056 345/156 |
| 2013/0235287 | A1* | 9/2013 | Im | G02B 27/2214 349/15 |
| 2013/0286678 | A1* | 10/2013 | Sugiyama | G02B 6/0011 362/602 |
| 2014/0104880 | A1* | 4/2014 | Yang | G02B 6/0035 362/611 |
| 2014/0301108 | A1* | 10/2014 | Mineura | H04N 5/66 362/615 |

FOREIGN PATENT DOCUMENTS

| | | |
|---|---|---|
| CN | 102207576 | 10/2011 |
| CN | 102297350 | 12/2011 |
| CN | 102449509 A | 5/2012 |
| CN | 102483522 A | 5/2012 |
| CN | 102692722 | 9/2012 |
| TW | 200410171 | 6/2004 |
| TW | I262458 | 9/2006 |
| WO | 2013080488 | 6/2013 |

* cited by examiner

LIGHT SOURCE MODULE, DISPLAY APPARATUS AND METHOD FOR DRIVING LIGHT SOURCE MODULE

CROSS-REFERENCE TO RELATED APPLICATION

This application claims the priority benefit of China application serial no. 201310243996.4, filed on Jun. 19, 2013. The entirety of the above-mentioned patent application is hereby incorporated by reference herein and made a part of this specification.

BACKGROUND

Technical Field

The invention relates to an optical module, a display apparatus, and a method for driving the optical module. Particularly, the invention relates to a light source module, a display apparatus capable of switching a two-dimensional and a three-dimensional image mode, and a method for driving the light source module.

Related Art

In recent years, along with development of display techniques, amelioration of image dynamic effect, improvement of color performance and contrast, and people's pursuit for more realistic and richer viewing experiences, three-dimensional (3D) image displays have become one of actively developed products in related technical field. Generally, the 3D displays are grouped into stereoscopic displays and auto-stereoscopic displays. Related techniques of the auto-stereoscopic display are a field to be developed in related display industry in recent years.

The related techniques of the auto-stereoscopic display approximately include a holographic stereoscopic image display technique, a volumetric stereoscopic image display technique, a multi-planar stereoscopic image display technique and a multiplexed 2D stereoscopic image display technique, etc. according to working principles thereof. The multiplexed 2D stereoscopic image display technique has a function of switching 2D and 3D image display modes, and has a difference of lenticular lens and parallax barrier according to a beam splitting principle. The parallax barrier technique has been widely applied to various stereoscopic display products, and becomes a noticeable 3D image display technique in recent years.

Generally, main components of the 3D display using the parallax barrier technique include two liquid crystal panels and a microretarder disposed between the two liquid crystal panels, where the microretarder is an optical thin film having a specific pattern arrangement, which may produce different phase retardations for light passing there through. A basic principle of the parallax barrier technique is to implement switching of the 2D and 3D modes by using the phase retardation of the microretarder and using different polarizations of one of the two liquid crystal panels. When the display is in the 3D mode, a part of the light beam could be shielded. In this way, one eye of the viewer could only view odd pixel pairs of the 3D display, and another eye could only view even pixel pairs of the liquid crystal panel, so as to produce a stereoscopic image.

However, since light transmittances of the liquid crystal panel and the microretarder are not high, compared to a general display, the 3D display using the parallax barrier display technique has a poor light usage rate due to applying of the liquid crystal panel and the microretarder, on the other hand, the manufacturing cost thereof is increased. Moreover, since the 3D display using the parallax barrier display technique implements switching of the display modes by using different polarizations of the liquid crystal panels, a switching speed of the display modes is limited by a response speed of the liquid crystal panel, and fast switching cannot be implemented.

U.S. Patent Publication No. 20110242441A1 discloses a light guide plate having a strip diffusion area. U.S. Patent Publication No. 20120242931A1 discloses a display apparatus having a wedge-shaped light guide plate and a grid plate. Taiwan Patent No. 1262458, U.S. Pat. No. 7,364,343B2, China Patent Publication No. 102449509A, China Patent Publication No. 102483522A and U.S. Pat. No. 8,189,973B2 respectively disclose an optical system having a light guide plate of a wedge-shaped structure design.

SUMMARY

The invention is directed to a light source module, by which a module cost is decreased, a whole light output efficiency is improved, and a switching speed between different image display modes is increased.

The invention is directed to a display apparatus, by which a module cost is decreased, a whole light output efficiency is improved, and a switching speed between different image display modes is increased.

The invention is directed to a method for driving a light source module, by which a module cost is decreased, a whole light output efficiency is improved, and a switching speed between different image display modes is increased.

Other objects and advantages of the invention can be further illustrated by the technical features broadly embodied and described as follows.

In order to achieve at least one of the objects or other objects, an embodiment of the invention provides a light source module, which is adapted to provide a first illumination beam to a display apparatus, where the display apparatus includes a display panel configured to display a two-dimensional (2D) image or a three-dimensional (3D) image. The light source module includes a first wedge-shaped light guide plate, a first light emitting device, a second light emitting device, and a light source driving module. The first wedge-shaped light guide plate has a first light incident surface and a second light incident surface opposite to the first light incident surface, where the first wedge-shaped light guide plate further includes an optical grating pattern, the optical grating pattern is located on a surface of the first wedge-shaped light guide plate, and the surface is connected to the first light incident surface and the second light incident surface. The first light emitting device is disposed beside the first light incident surface of the first wedge-shaped light guide plate. The second light emitting device is disposed beside the second light incident surface of the first wedge-shaped light guide plate. In a 2D image display mode, the light source driving module controls to turn on the first light emitting device for providing the first illumination beam to the first wedge-shaped light guide plate. In a 3D image display mode, the light source driving module controls to turn on the second light emitting device for providing the first illumination beam to the first wedge-shaped light guide plate.

In an embodiment of the invention, in the 2D image display mode, the light source driving module controls to turn on the second light emitting device for providing the first illumination beam to the first wedge-shaped light guide plate.

In an embodiment of the invention, widths of the first light incident surface and the second light incident surface of the first wedge-shaped light guide plate along a specific direction are respectively $S_{L1}$ and $S_{S1}$, where the width $S_{L1}$ is greater than the width $S_{S1}$. The widths $S_{L1}$ and $S_{S1}$ satisfy a condition of $1 < S_{L1}/S_{S1} \leq 10$.

In an embodiment of the invention, the optical grating pattern includes a first light propagating region and a second light propagating region, the first light propagating region and the second light propagating region are straight bar-shaped regions and are arranged in interlace, and the second light propagating region has scattering microstructures.

In an embodiment of the invention, the light source module further includes a light reflecting device, the first wedge-shaped light guide plate is disposed between the display panel and the light reflecting device, and the optical grating pattern is disposed on the surface of the first wedge-shaped light guide plate facing to the light reflecting device.

In an embodiment of the invention, the light source module further includes a light absorbing device, the first wedge-shaped light guide plate is disposed between the display panel and the light absorbing device, and the optical grating pattern is disposed on the surface of the first wedge-shaped light guide plate facing to the display panel.

In an embodiment of the invention, the light source module further includes an optical film disposed between the display panel and the first wedge-shaped light guide plate. The optical film includes a prism surface facing to the first wedge-shaped light guide plate.

In an embodiment of the invention, the light source module further includes a planar light source device for providing a second illumination beam, where the first wedge-shaped light guide plate is disposed between the planar light source device and the display panel, the planar light source device further includes a second light guide plate and a third light emitting device. The second light guide plate has a third light incident surface and a fourth surface opposite to the third light incident surface, where the first wedge-shaped light guide plate is disposed between the second light guide plate and the display panel. The third light emitting device is disposed beside the third light incident surface of the second light guide plate. In the 2D image display mode, the light source driving module controls to turn on the third light emitting device for providing the second illumination beam to the second light guide plate.

In an embodiment of the invention, widths of the third light incident surface and the fourth surface of the second light guide plate along the specific direction are respectively $S_{L2}$ and $S_{S2}$, where the width $S_{L2}$ is greater than or equal to the width $S_{S2}$. The widths $S_{L2}$ and $S_{S2}$ satisfy a condition of $1 < S_{L2}/S_{S2} \leq 10$.

In an embodiment of the invention, the light source module further includes at least one optical film disposed between the first wedge-shaped light guide plate and the second light guide plate. The at least one optical film includes at least one of or all of an upper diffusion film, a lower diffusion film, and a brightness enhancement film.

In an embodiment of the invention, the light source module further includes a light absorbing device or a light reflecting device, and the second light guide plate is disposed between the at least one optical film and the light absorbing device or between the at least one optical film and the light reflecting device.

An embodiment of the invention provides a display apparatus, the display apparatus includes the aforementioned light source module and the display module, and the display module includes a mode switching module, a light source driving module, an image control module, and a display panel. The mode switching module is configured to switch the display apparatus to a 2D image display mode or a 3D image display mode. The light source driving module is connected to the mode switching module, and is configured to drive the light source module to respectively provide a 2D mode light source and a 3D mode light source in the 2D image display mode and the 3D image display mode. The image control module is connected to the mode switching module, and is configured to drive the display module to respectively display a 2D image or a 3D image in the 2D image display mode and the 3D image display mode, and the display panel is configured to display the 2D image or the 3D image. The light source module includes a first wedge-shaped light guide plate, a first light emitting device, and a second light emitting device. The first wedge-shaped light guide plate includes a first light incident surface and a second light incident surface opposite to the first light incident surface, and the first light emitting device and the second light emitting device are respectively disposed beside the first light incident surface and the second light incident surface. The first wedge-shaped light guide plate further includes an optical grating pattern, where the optical grating pattern is located on a surface of the first wedge-shaped light guide plate, and the surface is connected to the first light incident surface and the second light incident surface. In the 2D image display mode, the light source driving module controls to turn on the first light emitting device to serve as a 2D mode light source for providing a first illumination beam to the first wedge-shaped light guide plate. In the 3D image display mode, the light source driving module controls to turn on the second light emitting device to serve as a 3D mode light source for providing the first illumination beam to the first wedge-shaped light guide plate.

An embodiment of the invention provides a method for driving a light source module, where the light source module is configured to provide a first illumination beam to a display apparatus, and the display apparatus is operated in a 2D image display mode or a 3D image display mode, and the method for driving the light source module includes following steps. First, the light source module is switched to the 2D image display mode or the 3D image display mode according to an image signal received by the display apparatus, where the light source module includes a first light emitting device, a second light emitting device, and a first wedge-shaped light guide plate. The first wedge-shaped light guide plate includes a first light incident surface and a second light incident surface opposite to the first light incident surface, and the first light emitting device and the second light emitting device are respectively disposed beside the first light incident surface and the second light incident surface. The first wedge-shaped light guide plate further includes an optical grating pattern, where the optical grating pattern is located on a surface of the first wedge-shaped light guide plate, and the surface is connected to the first light incident surface and the second light incident surface. Then, in the 2D image display mode, the first light emitting device is turned on to serve as a 2D mode light source for providing a first illumination beam to the first wedge-shaped light guide plate. The display apparatus displays a 2D image in the 2D image display mode. Alternatively, in the 3D image display mode, the second light emitting device is turned on to serve as a 3D mode light source for providing the first illumination beam to the first wedge-shaped light guide plate. The display apparatus displays a 3D image in the 3D image display mode.

According to the above descriptions, based on configuration of the optical grating pattern and the wedge-shaped light guide plate, by switching different modes of light source, switching of the 2D image display mode or the 3D image display mode is implemented, so as to decrease the manufacturing cost of the light source module, improve a whole light output efficiency of the display apparatus and effectively increase a switching speed between different image display modes.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
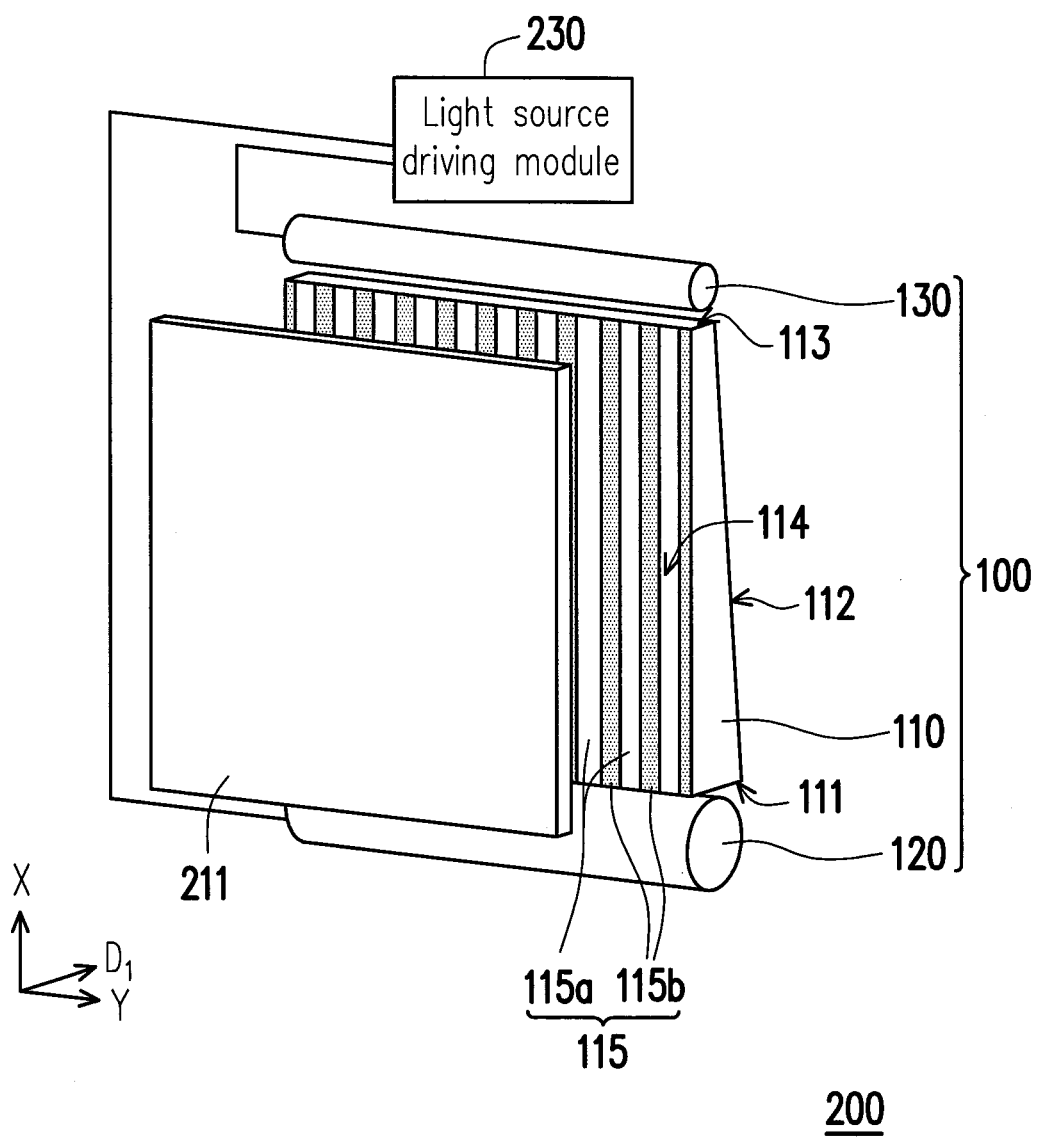
FIG. 1 is a three-dimensional view of a light source module and a display panel according to an embodiment of the invention.
Figure 2A:
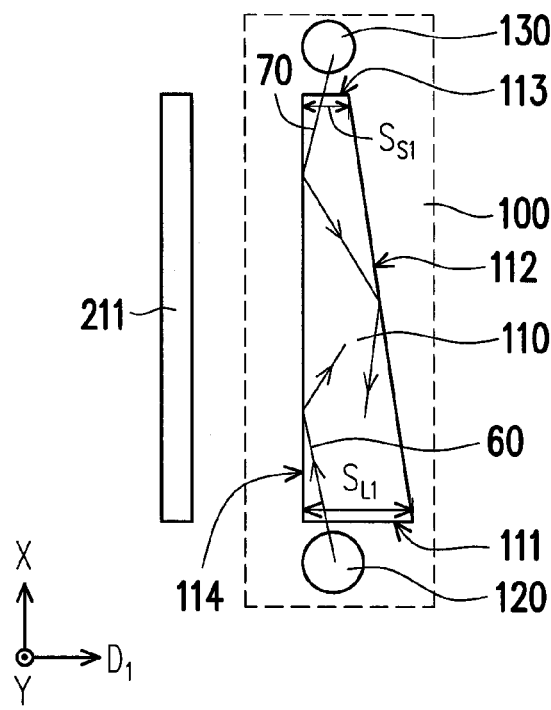
FIG. 2A is a cross-sectional view of a light source module and a display panel according to an embodiment of the invention.

FIG. 1 is a three-dimensional view of a light source module and a display panel according to an embodiment of the invention. FIG. 2A is a cross-sectional view of the light source module and the display panel according to an embodiment of the invention. Referring to FIG. 1 and FIG. 2A, in the embodiment, the light source module 100 could be used to provide an illumination beam in a display apparatus 200, where the display apparatus 200 includes a display panel 211 for displaying a two-dimensional (2D) image or a three-dimensional (3D) image.

In detail, the light source module 100 includes a first wedge-shaped light guide plate 110, a first light emitting device 120, a second light emitting device 130, and a light source driving module 230. In the embodiment, a material of the first wedge-shaped light guide plate 110 could be a compound with a high transmittance. For example, the material of the first wedge-shaped light guide plate 110 is, for example, polymethyl methacrylate (PMMA), polycarbonate (PC), cycloolefin copolymer (COC) or other suitable light guide materials. Moreover, in the embodiment, the first light emitting device 120 and the second light emitting device 130 are, for example, light emitting diode light bars, though the invention is not limited thereto, and in other applicable embodiments, the first light emitting device 120 and the second light emitting device 130 could also be cold cathode fluorescent lamps (CCFL), hot cathode fluorescent lamps, light emitting diode bars, electro luminescent (EL) films or other suitable light emitting devices.

In the embodiment, the first wedge-shaped light guide plate 110 has a first light incident surface 111 and a second light incident surface 113 opposite to the first light incident surface 111, that is, the first light incident surface 111 and the second light incident surface 113 are respectively located at two opposite sides of the first wedge-shaped light guide plate 110. The first light emitting device 120 is disposed besides the first light incident surface 111 of the first wedge-shaped light guide plate 110. The second light emitting device 130 is disposed besides the second light incident surface 113 of the first wedge-shaped light guide plate 110. In the embodiment, extending directions of the first light incident surface 111 and the second light incident surface 113 are, for example, parallel to a direction $D_1$. Moreover, widths of the first light incident surface 111 and the second light incident surface 113 of the first wedge-shaped light guide plate 110 along the specific direction $D_1$ are respectively $S_{L1}$ and $S_{S1}$, where the width $S_{L1}$ is greater than the width $S_{S1}$.

On the other hand, the first light emitting device 120 and the second light emitting device 130 could respectively provide light beams, for example, light beams 60 and 70, and the light beams 60 and 70 could respectively enter the first wedge-shaped light guide plate 110 from the first light incident surface 111 or the second light incident surface 113. Generally, after the light beams 60 and 70 enter the first wedge-shaped light guide plate 110, the light beams 60 and 70 are propagated in internal of the first wedge-shaped light guide plate 110 based on total reflection and refraction principles. The light beams 60 and 70 emit out of the first wedge-shaped light guide plate 110 only when a total reflection condition of the light beams 60 and 70 is spoiled. In detail, there are two methods of spoiling the total reflection condition of the light beam in internal of the first wedge-shaped light guide plate 110. One method is to add scattering microstructures on a surface of the first wedge-shaped light guide plate 110, and another method is to use a wedge-shaped structure design of the first wedge-shaped light guide plate 110 itself. How the light beams sent by the first light emitting device 120 and the second light emitting device 130 of the embodiment emit out of the first wedge-shaped light guide plate 110 under the aforementioned conditions is described below with reference of FIG. 2B to FIG. 2E.

Figure 2B:
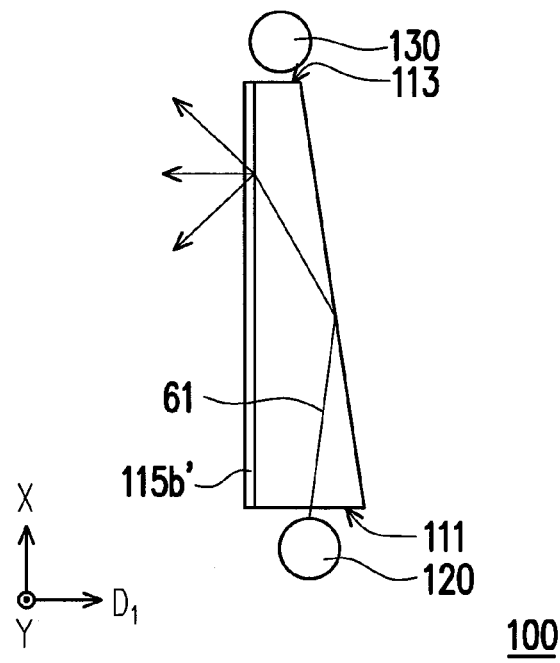
FIG. 2B, FIG. 2C, FIG. 2D, and FIG. 2E are schematic diagrams of various optical paths of illumination beams of the light source module of FIG. 2A that enters a first wedge-shaped light guide plate from different light incident surfaces.
Figure 2C:
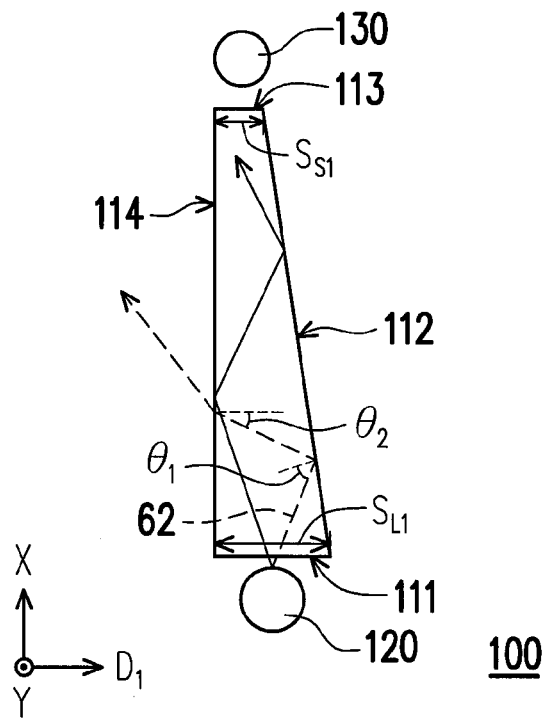
Figure 2D:
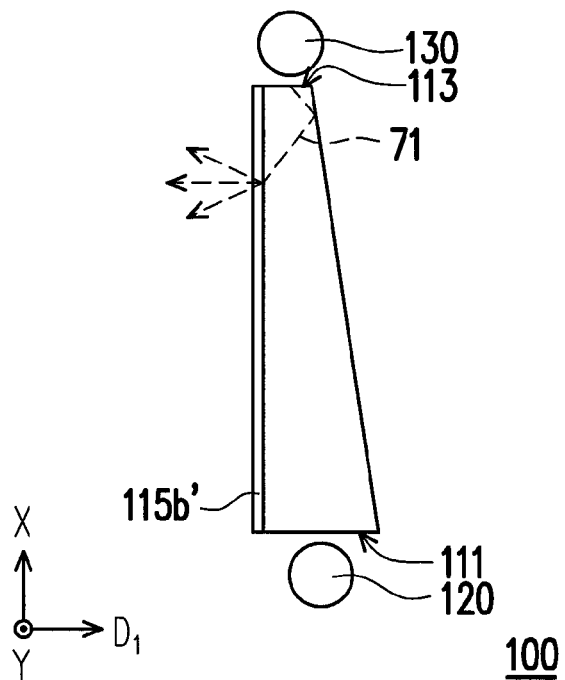

FIG. 2B, FIG. 2C, FIG. 2D, and FIG. 2E are schematic diagrams of various optical paths of illumination beams of the light source module of FIG. 2A that enters the first wedge-shaped light guide plate from different light incident surfaces. Referring to FIG. 2B and FIG. 2D, light beams 61 and 71 provided by the first light emitting device 120 and the second light emitting device 130 respectively enter the first wedge-shaped light guide plate 110 through the first light incident surface 111 and the second light incident surface 113, and when the light beams 61 and 71 are incident to scattering microstructures 115b', the scattering microstructures 115b' spoil the total reflection condition of the light beams 61 and 71, such that the light beams 61 and 71 are scattered out of the first wedge-shaped light guide plate 110. For example, the scattering microstructures 115b' could be patterns, rough microstructures, protruding microstructures, recessed microstructures or concave-convex microstructures. However, the invention is not limited thereto.

Figure 2E:
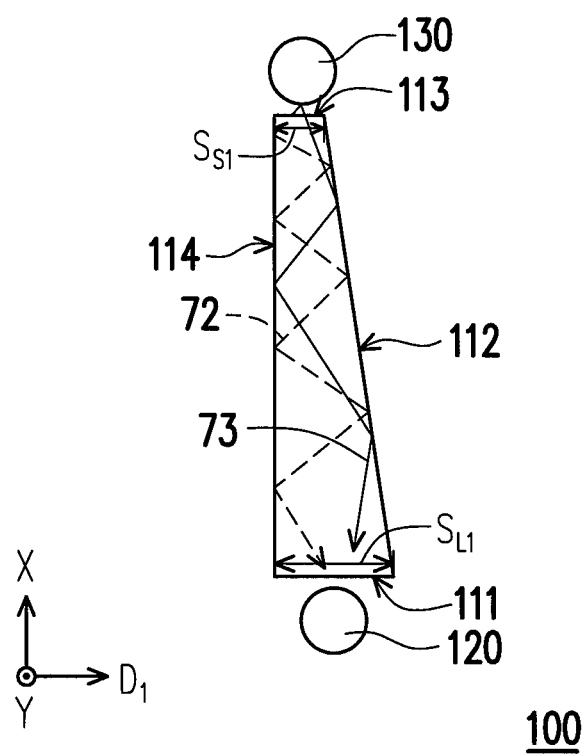

On the other hand, referring to FIG. 2C and FIG. 2E, in case that the scattering microstructures 115b' are not applied, since the width $S_{L1}$ of the first light incident surface 111 is greater than the width $S_{S1}$ of the second light incident surface 113, normal lines of two surfaces 112 and 114 of the first wedge-shaped light guide plate 110 are not parallel to each other, and reflection angles of the light beam of each time the light beam is reflected by the surface 112 or surface 114 within the first wedge-shaped light guide plate 110 are different after for multiple times. Referring to FIG. 2C, when another light beam 62 emitted by the first light emitting device 120 enters the first wedge-shaped light guide plate 110 through the first light incident surface 111, an incident angle of the light beam 62 incident to the surface 112 of the first wedge-shaped light guide plate 110 is $\theta_1$, and an incident angle of the light beam 62 incident to the surface 114 after being reflected by the surface 112 is $\theta_2$, where $\theta_2$ is smaller than $\theta_1$. In this way, incident angles of the light beam 62 incident to the two surfaces 112 and 114 are gradually decreased after the light beam 62 incident to the first wedge-shaped light guide plate 110 through the first light incident surface 111 is reflected for once or multiple times, and when the incident angle is smaller than a total reflection angle (critical angle), the light beam 62 is refracted to emit out. However, on the other hand, when the other light beams, for example, light beams 72 and 73 emitted by the second light emitting device 130 enter the first wedge-shaped light guide plate 110 through the second light incident surface 113, after multiple reflections, the incident angles of the light beams 72 and 73 incident to the two surfaces 112 and 114 are continually increased before the light beams 72 and 73 are reflected by the first light incident surface 111, and since the incident angle is greater than the total reflection angle (critical angle), the light beam couldn't emit out, as that shown in FIG. 2E.

A detailed structure design of the light source module 100 and a method for forming the same are described in detail below.

In the embodiment, the relationship between the width $S_{L1}$ of the first light incident surface 111 and the width $S_{S1}$ of the second light incident surface 113 satisfies a following expression: $1<S_{L1}/S_{S1}\leq10$. On the other hand, referring to FIG. 1, the first wedge-shaped light guide plate 110 of the embodiment further includes an optical grating pattern 115, where the optical grating pattern 115 is located on the surface 114 of the first wedge-shaped light guide plate 110, and the surface 114 is connected to the first light incident surface 111 and the second light incident surface 113, and in the embodiment, the surface 114 is, for example, a light emerging surface. The optical grating pattern 115 includes a first light propagating region 115a and a second light propagating region 115b, where the second light propagating region 115b, for example, has the scattering microstructures, and the first light propagating region 115a is, for example, a smooth plane (i.e. a region without structures).

It should be noticed that in the light source module 100 of the embodiment, the optical grating pattern 115 is, for example, formed through mold injection to synchronously fabricate the optical grating pattern 115 and the first wedge-shaped light guide plate 110. When the optical grating pattern 115 and the first wedge-shaped light guide plate 110 are fabricated through mold injection, the second light propagating region 115b of the optical grating pattern 115 and the first wedge-shaped light guide plate 110 are made of a same material. In other applicable embodiments, the other suitable processing method could be used to form the optical grating pattern 115. For example, after the first wedge-shaped light guide plate 110 is first formed through mold injection, lattice points (i.e. the second light propagating region 115b) are formed on a surface of the first wedge-shaped light guide plate 110 through a screen printing method to form the optical grating pattern 115. When the optical grating pattern 115 is formed through screen printing, materials of the first wedge-shaped light guide plate 110 and the second light propagating region 115b of the optical grating pattern 115 could be the same or different. However, the optical grating pattern 115 could also be fabricated through other methods, for example, ink jetting, etc., which is not limited by the invention.

Moreover, in the embodiment, although the optical grating pattern 115 of long straight stripes is taken as an example for descriptions, the invention is not limited thereto, and in other applicable embodiments, the optical grating pattern 115 could also be oblique stripes or other suitable patterns. Those skilled in the art may design different types or different forms of optical grating patterns according to an actual requirement.

Operation of switching between a 2D image display mode and a 3D image display mode of the light source module 100 is described in detail below.

Figure 3A:
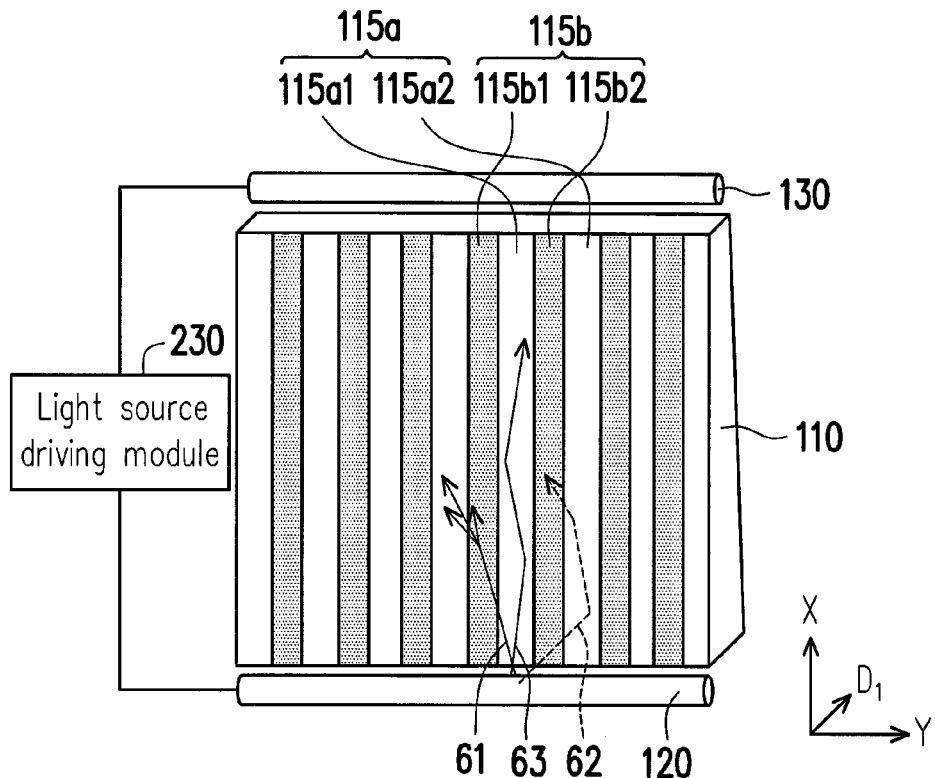
FIG. 3A is a schematic diagram of an optical path of the light source module of FIG. 2A under a 2D image display mode.
Figure 3B:
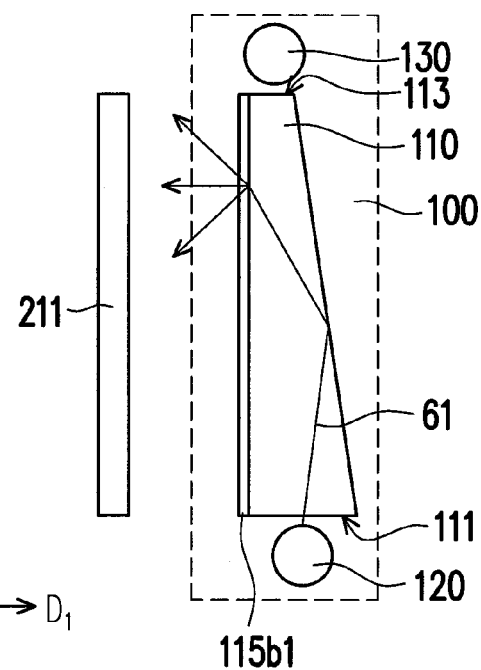
FIG. 3B and FIG. 3C are schematic diagrams of optical paths of an illumination beam of FIG. 3A in different light propagating regions.
Figure 3C:
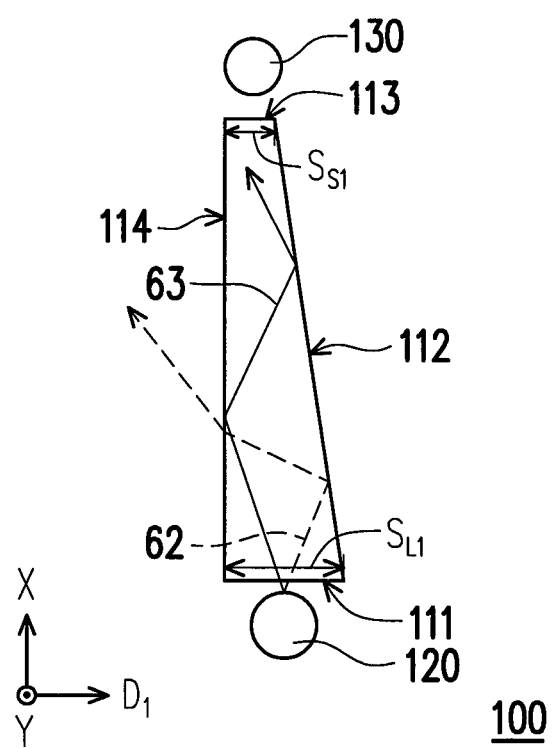

FIG. 3A is a schematic diagram of an optical path of the light source module of FIG. 2A under the 2D image display mode. FIG. 3B and FIG. 3C are schematic diagrams of optical paths of an illumination beam of FIG. 3A in different light propagating regions. Referring to FIG. 3A to FIG. 3C, under the 2D image display mode of the embodiment, the light source driving module 230 of the light source module 100 controls to turn on the first light emitting device 120, and the illumination beam provided by the first light emitting device 120 is propagated to the display panel 211 through the first light propagating region 115a and the second light propagating region 115b. For example, as that shown in FIG. 3B, after the light beam 61 sent by the first light emitting device 120 enters the first wedge-shaped light guide plate 110 through the first light incident surface 111, the light beam 61 is incident to the second light propagating region 115b1, and is scattered to emit out of the first wedge-shaped light guide plate 110 and propagated to the display panel 211 due to that the total reflection condition is not satisfied. On the other hand, referring to FIG. 3A and FIG. 3C, regarding the light beams 62 and 63 respectively propagated through the first light propagating region 115a1 and 115a2, after multiple reflections, the incident angles of the light beams 62 and 63 incident to the two surfaces 112 and 114 are gradually decreased. The light beam 63 couldn't emit out due to that the incident angle thereof is greater than the total reflection angle (critical angle), and the light beam 62 could emit out when the incident angle thereof is smaller than the total reflection angle (critical angle). In this way, the first wedge-shaped light guide plate 110 could provide uniform planar light source.

Figure 4A:
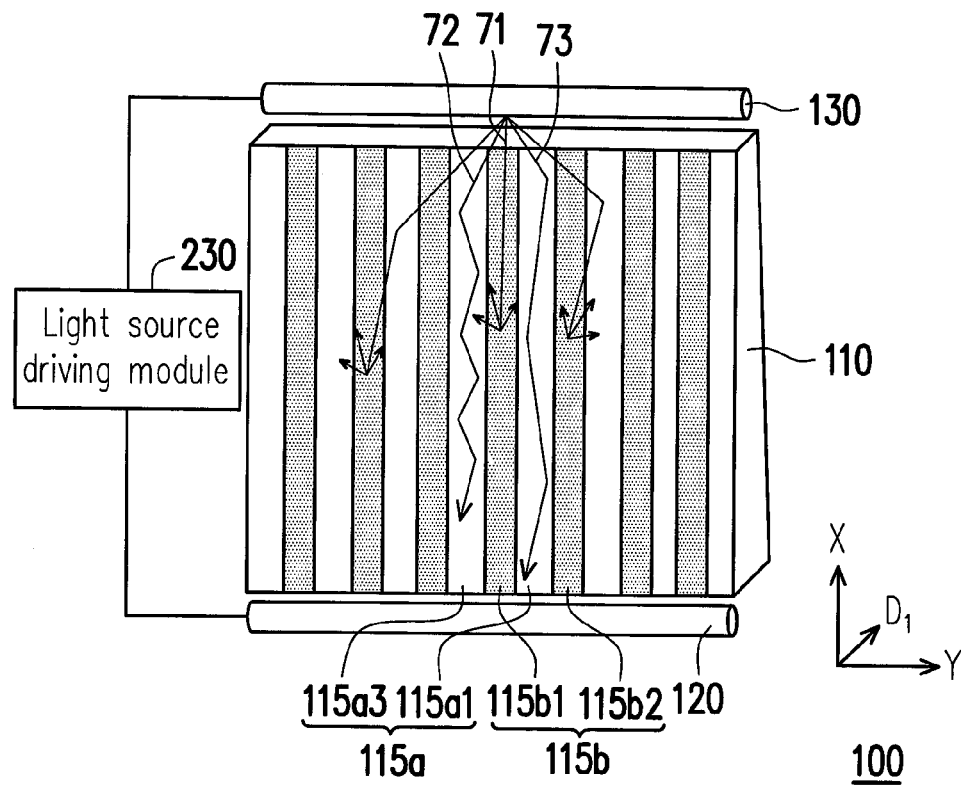
FIG. 4A is a schematic diagram of an optical path of the light source module of FIG. 2A under a 3D image display mode.
Figure 4B:
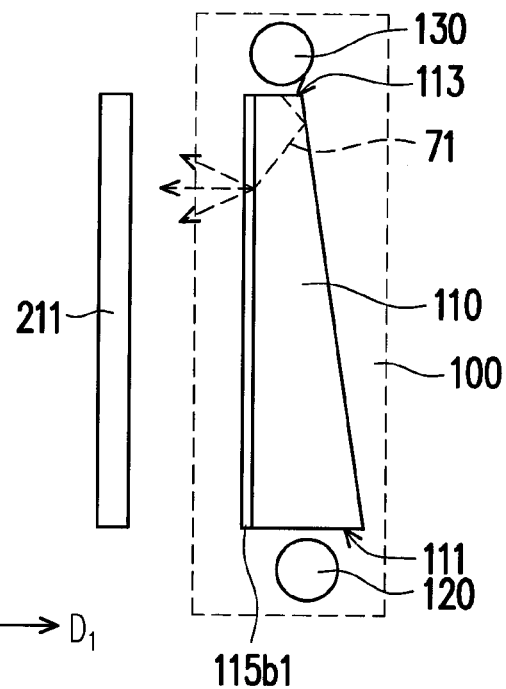
FIG. 4B and FIG. 4C are schematic diagrams of optical paths of an illumination beam of FIG. 4A in different light propagating regions.
Figure 4C:
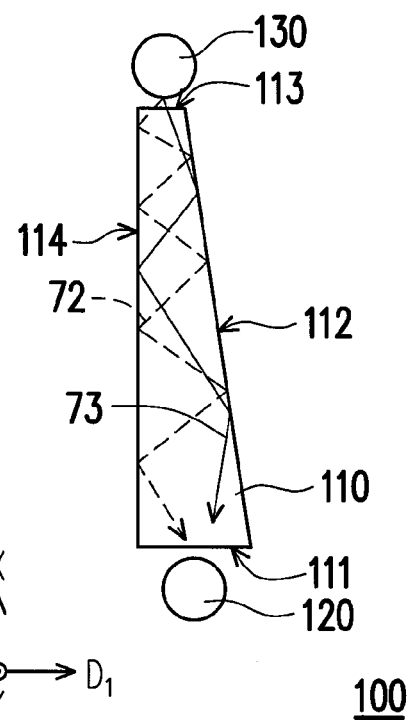

FIG. 4A is a schematic diagram of an optical path of the light source module of FIG. 2A under the 3D image display mode. FIG. 4B and FIG. 4C are schematic diagrams of optical paths of an illumination beam of FIG. 4A in different light propagating regions. Referring to FIG. 4A to FIG. 4C, under the 3D image display mode of the embodiment, the light source driving module 230 of the light source module 100 controls to turn on the second light emitting device 130, the first light propagating region 115a reflects a part of the illumination beam provided by the second light emitting device 130, and the other part of the illumination beam is propagated to the display panel 211 through the second light propagating region 115b. As shown in FIG. 4B, after the light beam 71 sent by the second light emitting device 130 enters the first wedge-shaped light guide plate 110 through the second light incident surface 113, the light beam 71 is incident to the second light propagating region 115b1, and is scattered to emit out of the first wedge-shaped light guide plate 110 and propagated to the display panel 211 due to that the total reflection condition is not satisfied. However, on the other hand, as shown in FIG. 4C, when the other light beams, for example, light beams 72 and 73 sent by the second light emitting device 130 enter the first wedge-shaped light guide plate 110 through the second light incident surface 113, after multiple reflections in the first light propagating regions 115a1 and 115a3, the incident angles of the light beams 72 and 73 incident to the two surfaces 112 and 114 are continually increased, so that the light beams 72 and 73 couldn't emit out of the first wedge-shaped light guide plate 110 due to that the incident angle thereof is greater than the total reflection angle (critical angle). In this way, the first wedge-shaped light guide plate 110 could selectively shield light beams of some positions according to a suitable pattern design of the optical grating pattern 115 commonly formed by the first light propagating region 115a and the second light propagating region 115b. Further, a light shape of the illumination beam emitted from the optical grating pattern 115 commonly formed by the first light propagating region 115a and the second light propagating region 115b is, for example, alternately arranged bright and dark regions, where the illumination beam could emit out from the second light propagating region 115b to form the bright regions, and the illumination beam couldn't emit out from the first light propagating region 115a to form the dark regions, so that the optical grating pattern 115 has a function similar to that of a parallax barrier. Therefore, under the 3D image display mode, one eye of a viewer could only view odd pixel pairs of the display panel 211, and another eye of the viewer could only view even pixel pairs of the display panel 211, so as to construct a 3D stereoscopic image in the viewer's eyes.

Therefore, through switching of the light emitting devices at different light incident surfaces on the first wedge-shaped light guide plate 110, a light matching pattern of the illumination beams provided to the display apparatus 200 by the first wedge-shaped light guide plate 110 could be designed to display a 2D image or a 3D image. In detail, in the embodiment and the following embodiments, the display apparatus 200 is, for example, a liquid crystal display (LCD) apparatus. In the 2D image display mode, the first light emitting device 120 of the light source module 100 is turned on to provide the illumination beam to the first wedge-shaped light guide plate 110, and in the 3D image display mode, the second light emitting device 130 is turned on to provide the illumination beam to the first wedge-shaped light guide plate 110. In this way, through switching of the light emitting devices, switching of the 2D image display mode or the 3D image display mode is implemented.

Moreover, it should be noticed that under the 2D image display mode of the embodiment, the first light emitting device 120 and the second light emitting device 130 of the light source module 100 could be simultaneously turned on to provide the illumination beams to the first wedge-shaped light guide plate 110. Now, although the illumination beam sent by the second light emitting device 130 is partially shielded due to the function of the optical grating pattern 115, since the illumination beam sent by the first light emitting device 120 may form an uniform planar light source after the function of the first wedge-shaped light guide plate 110, the light source module 100 could still provide the uniform planar light source illumination beam to the display panel 211 to display a complete 2D image on the display panel 211.

The aforementioned embodiments are only provided to describe a basic implementation of the light source module, which are not used to limit the invention. In other embodiments, the light source module may further include a light absorbing device, a light reflecting device, and an optical film, etc. Other possible implementations of the light source module are further described with reference of FIG. 5-FIG. 9.

Figure 5:
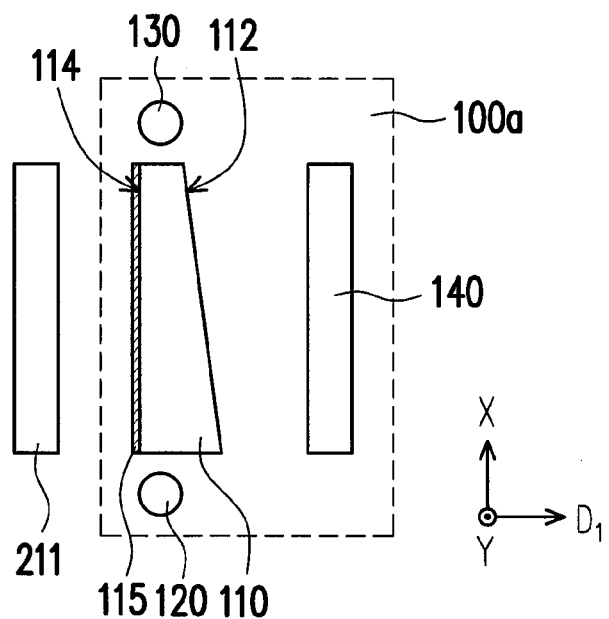
FIG. 5 is a cross-sectional view of a light source module and a display panel according to another embodiment of the invention.

FIG. 5 is a cross-sectional view of a light source module and a display panel according to another embodiment of the invention. Referring to FIG. 5, the light source module 100a of the embodiment is similar to the light source module 100 of FIG. 2A, and a difference there between is as follows. In the embodiment, the light source module 100a further includes a light absorbing device 140. The light absorbing device 140 could absorb light beams. For example, the light absorbing device 140 could be black material, black ink, mylar, silicon tape or other suitable light absorbing material. However, the invention is not limited thereto. The first wedge-shaped light guide plate 110 is disposed between the display panel 211 and the light absorbing device 140, and the optical grating pattern 115 is formed on the surface 114 of the first wedge-shaped light guide plate 110 facing to the display panel 211. In this way, by configuring the light absorbing device 140, redundant light noises are absorbed to improve display quality of the 3D stereoscopic image.

Figure 6:
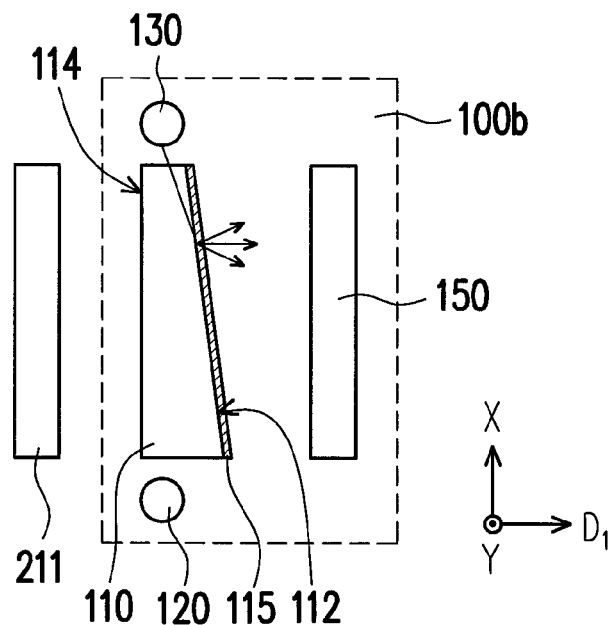
FIG. 6 is a cross-sectional view of a light source module and a display panel according to still another embodiment of the invention.

FIG. 6 is a cross-sectional view of a light source module and a display panel according to still another embodiment of the invention. Referring to FIG. 6, the light source module 100b of the embodiment is similar to the light source module 100 of FIG. 2A, and a difference there between is as follows. In the embodiment, the light source module 100b further includes a light reflecting device 150. The light reflecting device 150 could reflect light beams. For example, the light reflecting device 150 could be a white reflector, a silver reflector or other suitable light reflecting material. However, the invention is not limited thereto. The first wedge-shaped light guide plate 110 is disposed between the display panel 211 and the light reflecting device 150, and the optical grating pattern 115 could be disposed on the surface 112 of the first wedge-shaped light guide plate 110 facing to the light reflecting device 150. In this way, by configuring the light reflecting device 150, a ratio of the illumination beam propagated to the display panel 211 by the light source module 100b is increased to improve brightness.

Figure 7:
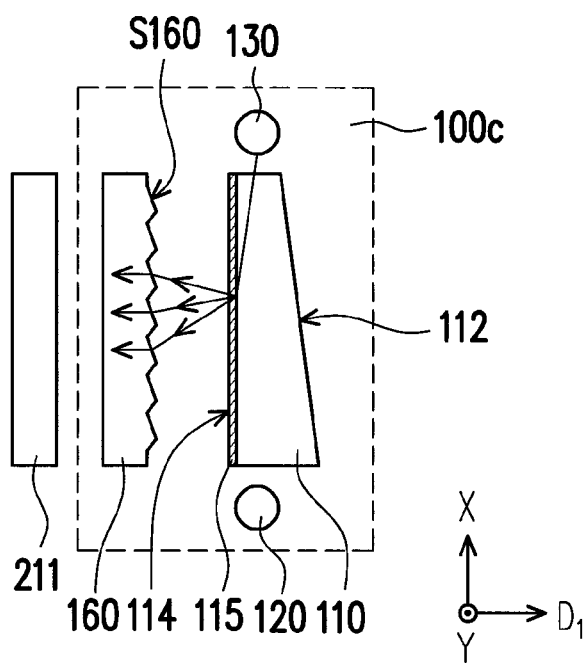
FIG. 7 is a cross-sectional view of a light source module and a display panel according to yet another embodiment of the invention.

FIG. 7 is a cross-sectional view of a light source module and a display panel according to yet another embodiment of the invention. Referring to FIG. 7, the light source module 100c of the embodiment is similar to the light source module 100 of FIG. 2A, and a difference there between is as follows. In the embodiment, the light source module 100c further includes an optical film 160 disposed between the display panel 211 and the first wedge-shaped light guide plate 110. Moreover, the optical film 160 includes a prism surface S160 facing to the first wedge-shaped light guide plate 110. In the embodiment, the optical grating pattern 115 is disposed on the surface 114 of the first wedge-shaped light guide plate 110 facing to the display panel 211, though the invention is not limited thereto, and the optical grating pattern 115 could also be disposed on the surface 112 of the first wedge-shaped light guide plate 110. When the light beam in internal of the first wedge-shaped light guide plate 110 is scattered to emit out, through the function of the prism surface S160, a propagating angle of the light beam could be suitably adjusted for collimation. In this way, a ratio of forward light of the illumination beam propagated to the display panel 211 by the light source module 100c is increased to improve the image brightness.

Figure 8:
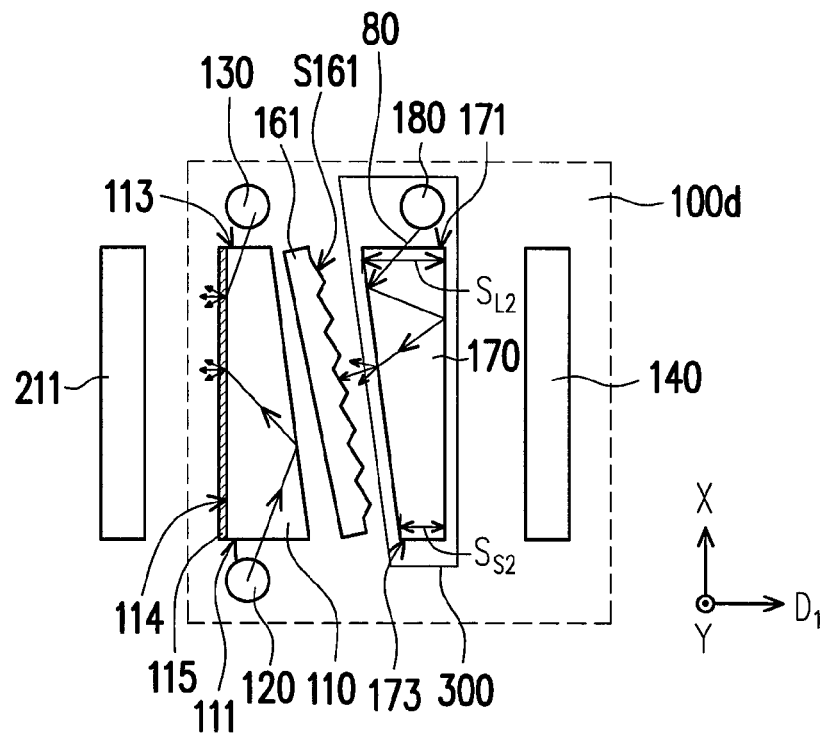
FIG. 8 is a cross-sectional view of a light source module and a display panel according to still another embodiment of the invention.

FIG. 8 is a cross-sectional view of a light source module and a display panel according to still another embodiment of the invention. Referring to FIG. 8, the light source module 100d of the embodiment is similar to the light source module 100 of FIG. 2A, and a difference there between is as follows. In the embodiment, the light source module 100d further includes a planar light source device 300 for providing another illumination beam. The illumination beam is an uniform planar light source, which could further improves the image brightness, where the first wedge-shaped light guide plate 110 is disposed between the planar light source device 300 and the display panel 211. The planar light source device 300 further includes a second light guide plate 170 and a third light emitting device 180. The second light guide plate 170 has a third light incident surface 171 and a fourth surface 173 opposite to the third light incident surface 171, that is, the third light incident surface 171 and the fourth surface 173 are respectively located at opposite sides of the second light guide plate 170. Moreover, extending directions of the third light incident surface 171 and the fourth surface 173 of the second light guide plate 170 is, for example, parallel to the direction $D_1$, and widths of the third light incident surface 171 and the fourth surface 173 along the specific direction $D_1$ are respectively $S_{L2}$ and $S_{S2}$, where the width $S_{L2}$ of the third light incident surface 171 is greater than or equal to the width $S_{S1}$ of the fourth surface 173. Therefore, the second light guide plate 170 of the embodiment could be a wedge-shaped light guide plate (as that shown in FIG. 8, and the width $S_{L2}$ of the third light incident surface 171 is greater than the width $S_{S2}$ of the fourth surface 173) or flat-type light guide plate (for example, a second light guide plate 170' of FIG. 9, the width $S_{L2}$ of the third light incident surface 171' is equal to the width $S_{S2}$ of the fourth surface 173). Moreover, in the embodiment, a relationship between the width $S_{L2}$ and the width $S_{S2}$ satisfies a following expression: $1 < S_{L2}/S_{S2} \leq 10$.

On the other hand, the first wedge-shaped light guide plate 110 is disposed between the second light guide plate 170 and the display panel 211. Moreover, the optical grating pattern 115 is disposed on the surface 114 of the first wedge-shaped light guide plate 110 facing to the display panel 211. The third light emitting device 180 is disposed besides the third light incident surface 171 of the second light guide plate 170. Moreover, the light source module 100d further includes at least one optical film 161 disposed between the first wedge-shaped light guide plate 110 and the second light guide plate 170. Moreover, the optical film 161 may include at least one of or all of an upper diffusion film, a lower diffusion film, and a brightness enhancement film, which is not limited by the invention, and those skilled in the art may design different types or different forms of optical films according to an actual requirement, which is not repeated. In the embodiment, only one implementation is illustrated, which has one optical film 161 and one prism surface S161.

In the embodiment, under the 2D image display mode, the first light emitting device 120 is turned on for providing the illumination beam to the first wedge-shaped light guide plate 110, and the third light emitting device 180 is turned on for providing the illumination beam to the second light guide plate 170. The illumination beam, for example, the light beam 80 sent by the third light emitting device 180 emits out after being reflected for multiple times due to that the incident angle thereof is smaller than the total reflection angle, and after the light beam 80 is collimated under the function of the prism surface S161, the light beam 80 is incident to the first wedge-shaped light guide plate 110. Thereafter, the light beam 80 and the illumination beam provided to the first wedge-shaped light guide plate 110 by the first light emitting device 120 are all functioned by the optical grating pattern 115 and propagated to the display panel 211.

Under the 3D image display mode, the second light emitting device 130 is turned on for providing the illumination beam to the first wedge-shaped light guide plate 110, and the illumination beam provided to the first wedge-shaped light guide plate 110 by the second light emitting device 130 is functioned by the optical grating pattern 115 and is propagated to the display panel 211.

In this way, by switching different light sources, the light source module 100*d* of the embodiment could implement switching of the 2D image display mode or the 3D image display mode.

Moreover, in the embodiment, the light source module 100*d* further includes a light absorbing device or a light reflecting device, which is the light absorbing device 140 in the embodiment, and the second light guide plate 170 is disposed between the optical film 161 and the light absorbing device 140. In this way, by configuring the light absorbing device 140, the redundant light noises are absorbed to improve the display quality of the 3D stereoscopic image.

Figure 9:
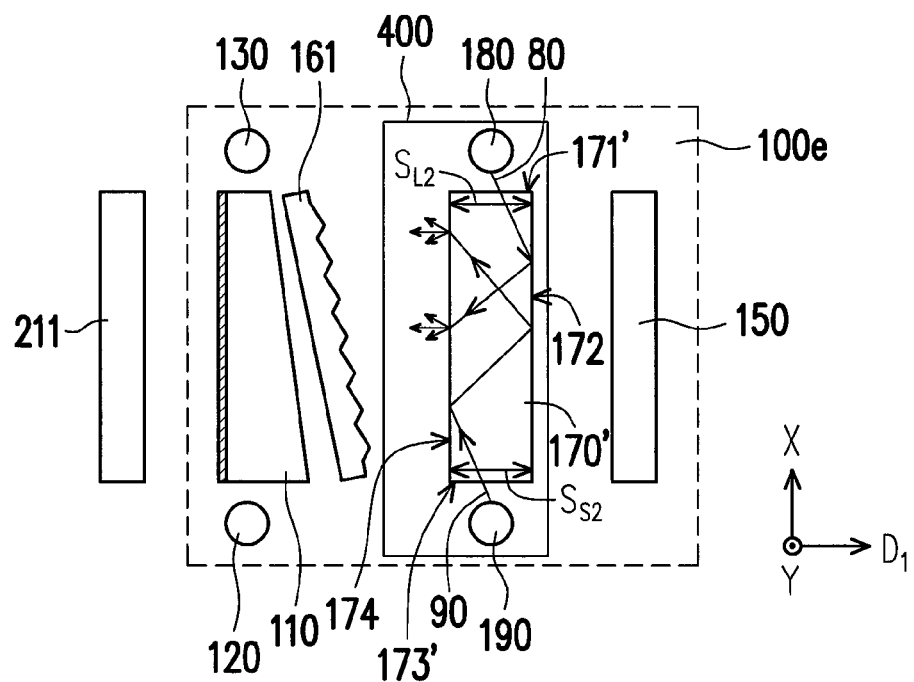
FIG. 9 is a cross-sectional view of a light source module and a display panel according to still another embodiment of the invention.

FIG. 9 is a cross-sectional view of a light source module and a display panel according to still another embodiment of the invention. Referring to FIG. 9, the light source module 100*e* of the embodiment is similar to the light source module 100*d* of FIG. 8, and differences there between are as follows. In the embodiment, the wedge-shaped second light guide plate 170 of the light source module 100*d* is replaced by a flat-type second light guide plate 170' of the light source module 100*e*, the light absorbing device 140 of the light source module 100*d* is replaced by the light reflecting device 150 of the light source module 100*e*, and the planar light source device 400 further includes a fourth light emitting device 190, where the fourth light emitting device 190 is disposed besides the fourth surface 173' of the second light guide plate 170', and the fourth surface 173' could be another light incident surface opposite to the third light incident surface 171'.

Under the 2D image display mode of the embodiment, the first light emitting device 120 is turned on for providing the illumination beam to the first wedge-shaped light guide plate 110, and one of or all of the third light emitting device 180 and the fourth light emitting device 190 are turned on for providing the illumination beam to the second light guide plate 170'. The illumination beams (light beams 80 and 90) sent by the third light emitting device 180 and the fourth light emitting device 190 emit out due to that the total reflection is spoiled by the scattering microstructures (not shown) configured on one of the surfaces 172 and 174, and after the light adjustment of the optical film 161, the light beam is incident to the first wedge-shaped light guide plate 110. Thereafter, the above illumination beam and the illumination beam provided to the first wedge-shaped light guide plate 110 by the first light emitting device 120 are functioned by the optical grating pattern 115 and propagated to the display panel 211.

Under the 3D image display mode, the second light emitting device 130 is turned on for providing the illumination beam to the first wedge-shaped light guide plate 110, and after the illumination beam provided to the first wedge-shaped light guide plate 110 by the second light emitting device 130 is functioned by the optical grating pattern 115, the illumination beam is propagated to the display panel 211.

Through configuration of the light reflecting device 150, a ratio of the illumination beam propagated to the display panel 211 by the light source module 100*e* is increased to improve the image brightness. Moreover, through configuration of the planar light source devices 300 and 400, uniform planar light source could be provided to further increase the ratio of the illumination beam propagated to the display panel 211 by the light source modules 100*d* and 100*e*, so as to improve the image brightness.

Further, since a difference between the aforementioned light source module 100*a*, 100*b* or 100*c* and the light source module 100 mainly lies in adding of the light absorbing device 140, the light reflecting device 150 or the optical film 160, etc., the light source module 100*a*, 100*b* or 100*c* also has main functions and effects described in the embodiment of the light source module 100, and related mechanisms and implementation details have been described in detail in the embodiment of the light source module 100, which are not repeated.

On the other hand, since the light absorbing device 140 could be used to increase the display quality of the 3D stereoscopic image, the light reflecting device 150 could be used to increase the image brightness, and the optical film 161 could be used to adjust the light beam, those skilled in the art could add the aforementioned devices or a combination thereof to the light source module according to an actual requirement, so as to construct the aforementioned various light source modules 100*d*, 100*e* or other types of optical modules, which also have the main functions and effects described in the embodiment of the light source module 100, and related mechanisms and implementation details thereof have been described in detail in the embodiment of the light source module 100, which are not repeated.

Figure 10:
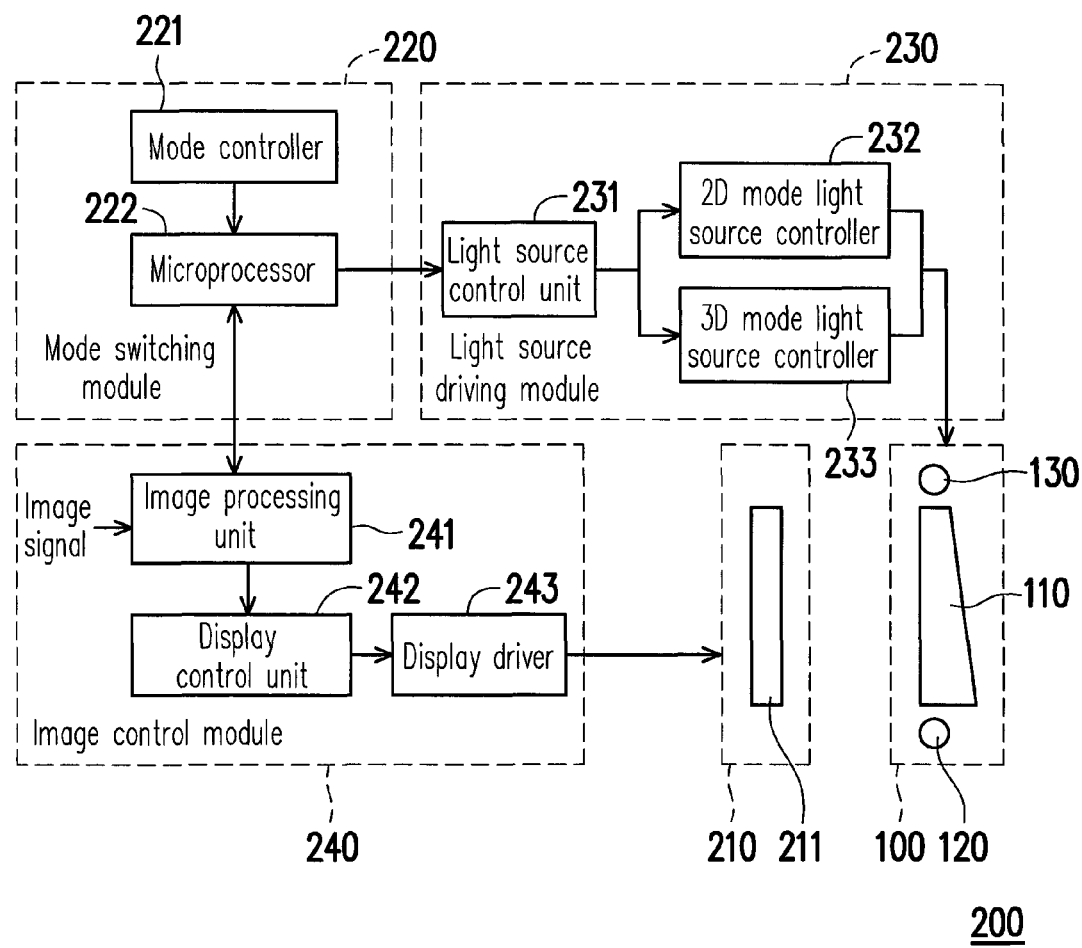
FIG. 10 is a structural schematic diagram of a display apparatus according to an embodiment of the invention.

FIG. 10 is a structural schematic diagram of a display apparatus according to an embodiment of the invention. Referring to FIG. 10, the display apparatus 200 of the embodiment includes a light source module 100, a display module 210, a mode switching module 220, a light source driving module 230, and an image control module 240. Detailed structure and functional mechanism of the light source module 100 have been described in the aforementioned embodiment, which are not repeated.

In the embodiment, the mode switching module 220 is used for switching the display apparatus 200 to a 2D image display mode or a 3D image display mode. In detail, the mode switching module 220 further has a mode controller 221 and a microprocessor 222, where the mode controller 221 could control switching of the 2D image display mode or the 3D image display mode to send a corresponding signal. The microprocessor 222 receives the signal sent by the mode controller 221, and transmits a corresponding control signal to the light source driving module 230 and the image control module 240 after confirming the display mode.

The image control module 240 is connected to the mode switching module 220, and drives the display module 210 to respectively display a 2D image or a 3D image in the 2D image display mode and the 3D image display mode. In detail, the image control module 240 further includes an image processing unit 241, a display control unit 242, and a display driver 243, and the display module 210 further includes a display panel 211. The image processing unit 241 receives an image signal, and in the 3D image display mode, the image processing unit 241 further processes the image signal to ensure sure that user's left eye and right eye receive a corresponding left eye image and a right eye image. In the 2D image display mode, the image processing unit 241 does not process the image signal. Moreover, after completing the image processing, the image processing unit 241 sends a corresponding image signal to the microprocessor 222, and the microprocessor 222 could perform a follow-up procedure of controlling the light source driving module 230. On the other hand, the display control unit 242 receives the image signal processed by the image processing unit 241, and implements display according to pixel of different rows and columns in the 3D display mode for corresponding to different images received by the left eye and the right eye, and directly displays the image signal transmitted by the image processing unit 241 in the 2D image display mode. The display driver 243 drives the display panel 211 of the display module 210 to respectively display the 2D image or the 3D image in the 2D image display mode and the 3D image display mode after receiving the display signal sent by the display control unit 242.

On the other hand, the light source driving module 230 is connected to the mode switching module 220 for driving the light source module 100 to respectively provide a 2D mode light source and a 3D mode light source in the 2D image display mode and the 3D image display mode. In detail, the light source driving module 230 further includes a light source control unit 231, a 2D mode light source controller 232 and a 3D mode light source controller 233. According to the signal sent by the mode controller 221 and the image signal of the display apparatus 200, the microprocessor 222 sends a corresponding control signal to the light source control unit 231. Thereafter, the light source control unit 231 selects a light source driving mode and drives the corresponding light source controller to implement light source switching of different image display modes. Then, in the 2D image display mode, the light source control unit 231 could drive the 2D mode light source controller 232 to turn on the first light emitting device 120 of the light source module 100 or simultaneously turn on the first light emitting device 120 and the second light emitting device 130 to serve as a 2D mode light source for providing the illumination beam to the first wedge-shaped light guide plate 110. In the 3D image display mode, the light source control unit 231 could drive the 3D mode light source controller 233 to turn on the second light emitting device 130 to serve as a 3D mode light source for providing the illumination beam to the first wedge-shaped light guide plate 110.

Moreover, it should be noticed that although the light source module 100 is taken as an example for descriptions, the invention is not limited thereto. The light source module 100a, 100b or 100c described in other embodiments of the invention could also serve as a light source module in the display apparatus 200 due to that the light source module 100a, 100b or 100c has similar effect with that of the light source module 100. Those skilled in the art could select the light source module of the aforementioned embodiment or other applicable light source module according to an actual requirement, so as to construct other possible display apparatus, which is not repeated.

On the other hand, since the light source module 100d further includes the second light guide plate 170 and the third light emitting device 180, when the light source module 100d serves as the light source module in the display apparatus, it may have the 2D mode light source or the 3D mode light source of the other combination type, similarly, the light source module 100e also has the same situation, which is described in detail below.

Figure 11:
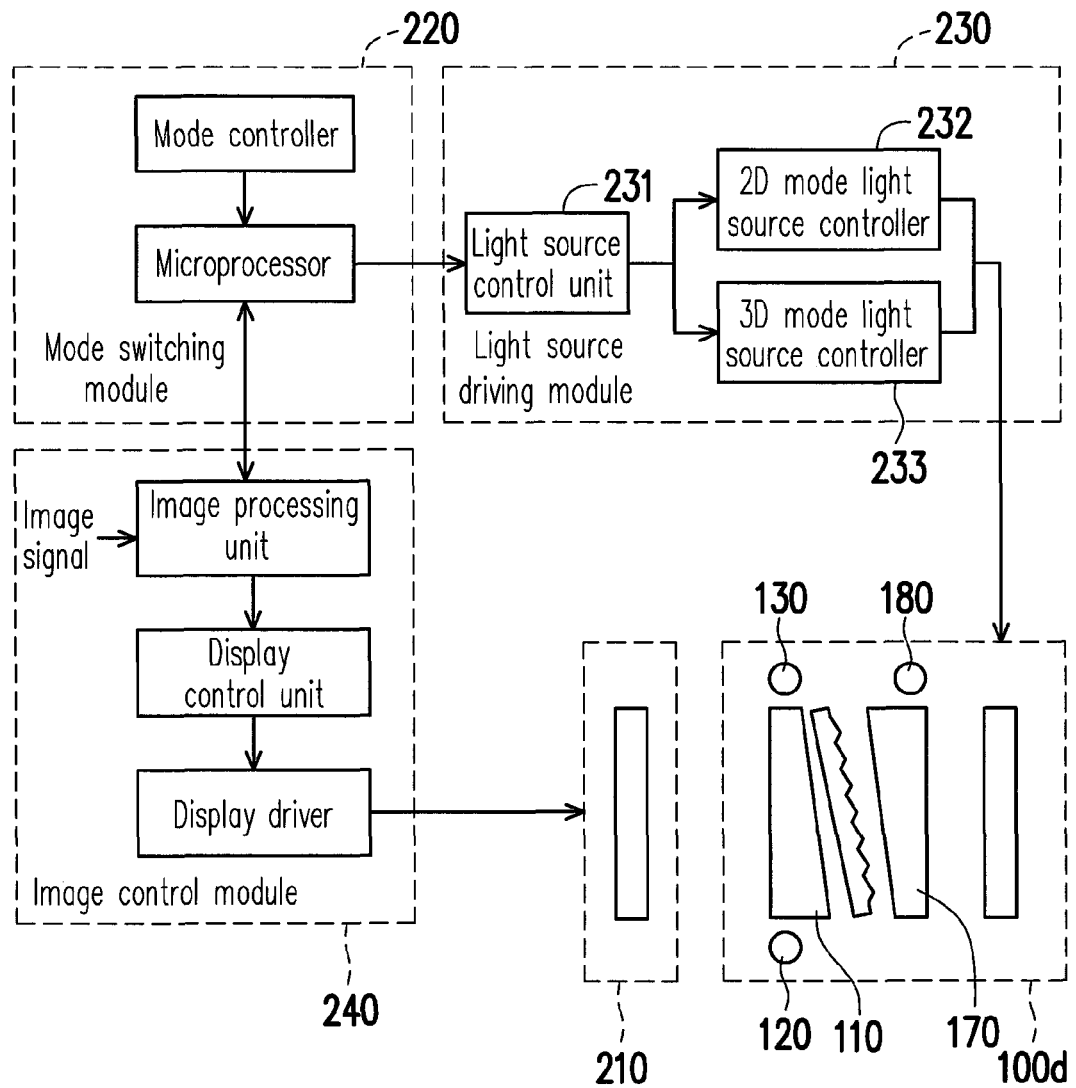
FIG. 11 is a structural schematic diagram of a display apparatus according to still another embodiment of the invention.

FIG. 11 is a structural schematic diagram of a display apparatus according to still another embodiment of the invention. Referring to FIG. 11, the display apparatus 200a of the embodiment is similar to the display apparatus 200 of FIG. 10, and a difference there between is as follows. In the embodiment, the display apparatus 200a includes the light source module 100d, where detailed structure and principle mechanism of the light source module 100d have been described in the aforementioned embodiment of the light source module 100d, so that the aforementioned descriptions could be referred for related details of the light source module 100d, which are not repeated.

In the 2D image display mode of the embodiment, the light source control unit 231 could drive the 2D mode light source controller 232 to simultaneously turn on the first light emitting device 120 and the third light emitting device 180 of the light source module 100d to serve as the 2D mode light source, so as to respectively provide the illumination beams to the first wedge-shaped light guide plate 110 and the second light guide plate 170. Alternatively, the first light emitting device 120, the second light emitting device 130, and the third light emitting device 180 are simultaneously turned on to serve as the 2D mode light source, so as to respectively provide the illumination beams to the first wedge-shaped light guide plate 110 and the second light guide plate 170.

In the 3D image display mode of the embodiment, the light source control unit 231 could drive the 3D mode light source controller 233 to turn on the second light emitting device 130 to serve as the 3D mode light source, so as to respectively provide the illumination beam to the first wedge-shaped light guide plate 110 and the second light guide plate 170.

Besides, other implementation details of the display apparatus 200a are all similar to that of the display apparatus 200, and the aforementioned descriptions could be referred for related details thereof, which are not repeated.

Figure 12:
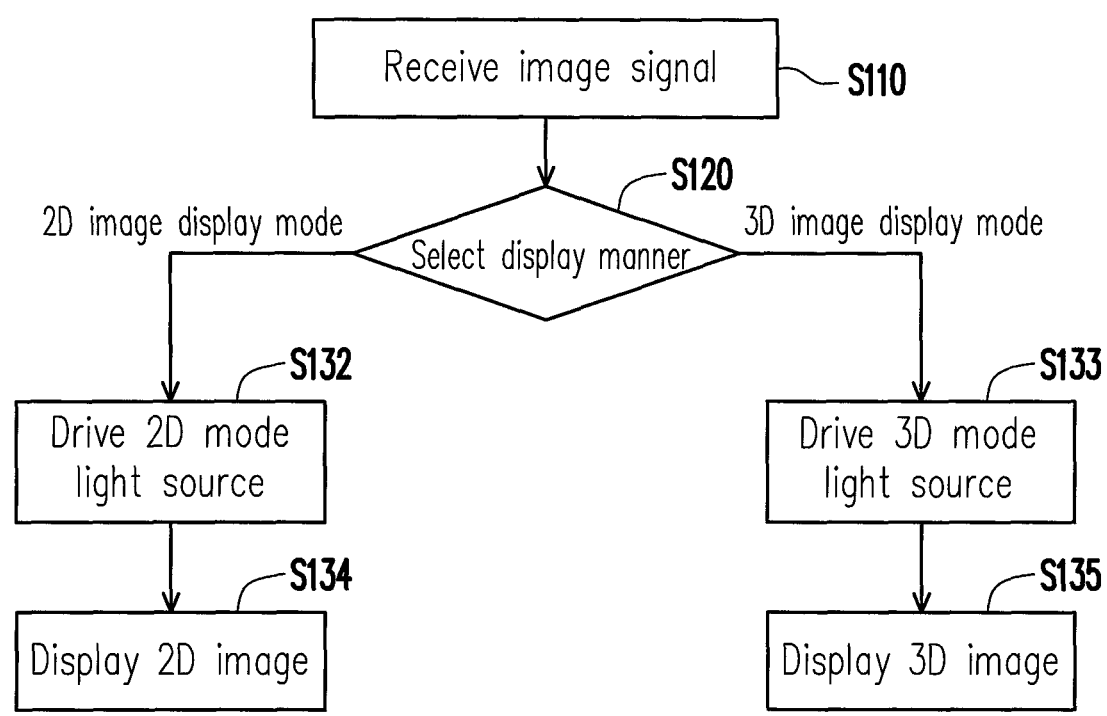
FIG. 12 is a flowchart illustrating a method for driving a light source module according to an embodiment of the intention.

FIG. 12 is a flowchart illustrating a method for driving a light source module according to an embodiment of the intention. Referring to FIG. 12, the method for driving the light source module 100 of the embodiment could be executed by the display apparatus 200 of FIG. 10. The method for driving the light source module 100 of the embodiment is as follows. The light source module is manually or automatically switched to a 2D image display mode or a 3D image display mode according to an image signal received by the display apparatus 200. In the 2D image display mode, the first light emitting device 120 is turned on to serve as a 2D mode light source, and in the 3D image display mode, the second light emitting device 130 is turned on to serve as a 3D mode light source. In detail, the method for driving the light source module 100 includes following steps. First, in step S110, the display apparatus 200 receives an image signal. Then, in step S120, a desired image display mode is selected by a viewer. When the viewer selects the 2D image display mode, a step S132 is executed, by which the 2D mode light source is driven, and the display apparatus 200 displays the 2D image, as that shown in step S134. On the other hand, when the viewer selects the 3D image display mode, a step S133 is executed, by which the 3D mode light source is driven, and the display apparatus 200 displays the 3D image, as that shown in step S135. In this way, by switching different modes of light source, switching of the 2D image display mode or the 3D image display mode is implemented, so that the switching speed between different image display modes is effectively increased. Other details of the method for driving the light source module 100 of the embodiment has been described in the aforementioned embodiment of the display apparatus 200, and the aforementioned descriptions could be referred for details thereof, which are not repeated.

Moreover, it should be noticed that although the display apparatus 200 is taken as an example for descriptions, the invention is not limited thereto. The display apparatus 200a described in the other embodiment of the invention could also execute the method for driving the light source module due to that the display apparatus 200a has a light source module driving device similar with that of the display apparatus 200, and details thereof are not repeated.

On the other hand, since the light source module 100d of the display apparatus 200a of FIG. 11 further include the second light guide plate 170 and the third light emitting device 180, when the light source module 100d serves as the light source module in the display apparatus, it may have the 2D mode light source or the 3D mode light source of the other combination type. Detailed steps of the method for driving the light source module 100d of the embodiment have been described in the aforementioned embodiment of the display apparatus 200a, so that the aforementioned descriptions could be referred for details thereof, which are not repeated.

Figure 13:
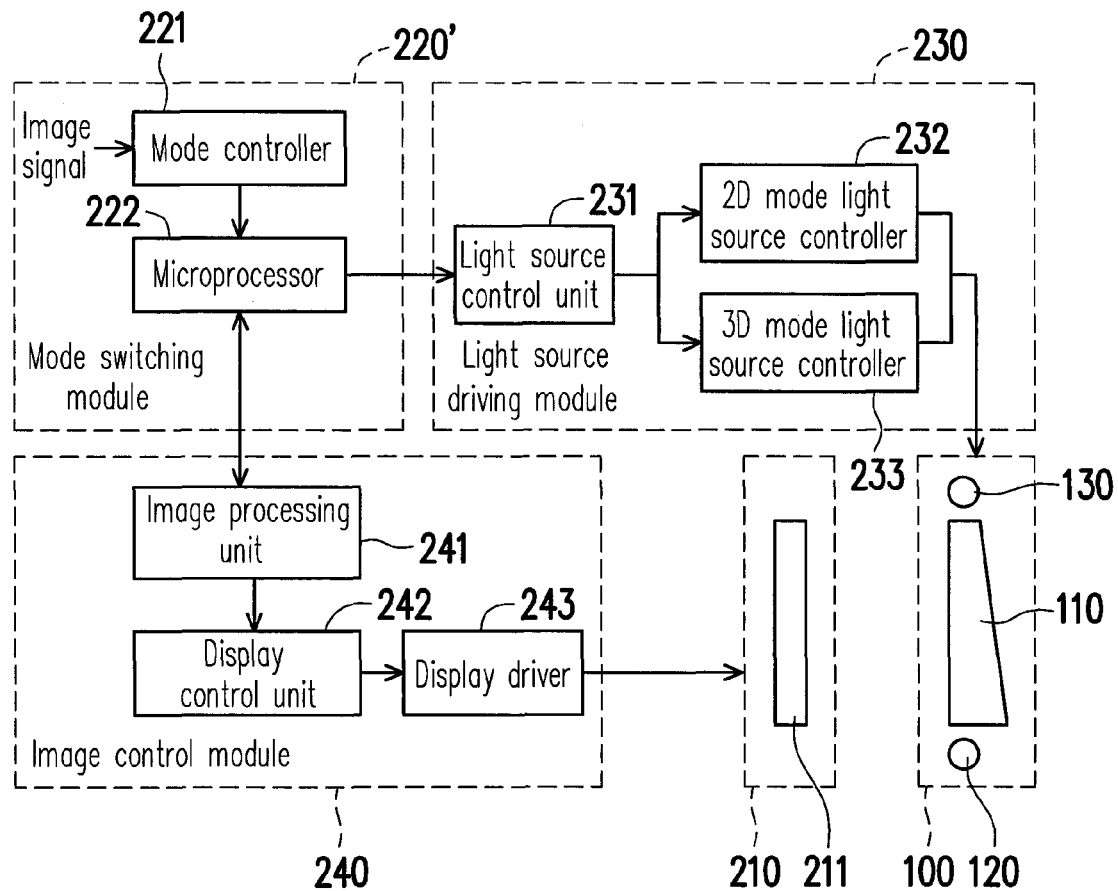
FIG. 13 is a structural schematic diagram of a display apparatus according to still another embodiment of the invention.

FIG. 13 is a structural schematic diagram of a display apparatus according to still another embodiment of the invention. Referring to FIG. 13, the display apparatus 200b of the embodiment is similar to the display apparatus 200 of FIG. 10, and a difference there between is as follows. In the embodiment, the mode switching module 220' receives an image signal and determines whether the image signal is a 2D image signal or a 3D image signal, so as to control the display apparatus 200b to operate in the 2D image display mode or the 3D image display mode. In detail, the mode switching module 220' further has a mode controller 221 and a microprocessor 222. The mode controller 221 could receive the image signal and determines whether the image signal is the 2D image signal or the 3D image signal, and controls switching of the 2D image display mode or the 3D image display mode to send a corresponding signal. The microprocessor 222 receives the signal sent by the mode controller 221, and after confirming the display mode, the microprocessor 222 send the corresponding control signal to the light source driving module 230 and the image control module 240.

Figure 14:
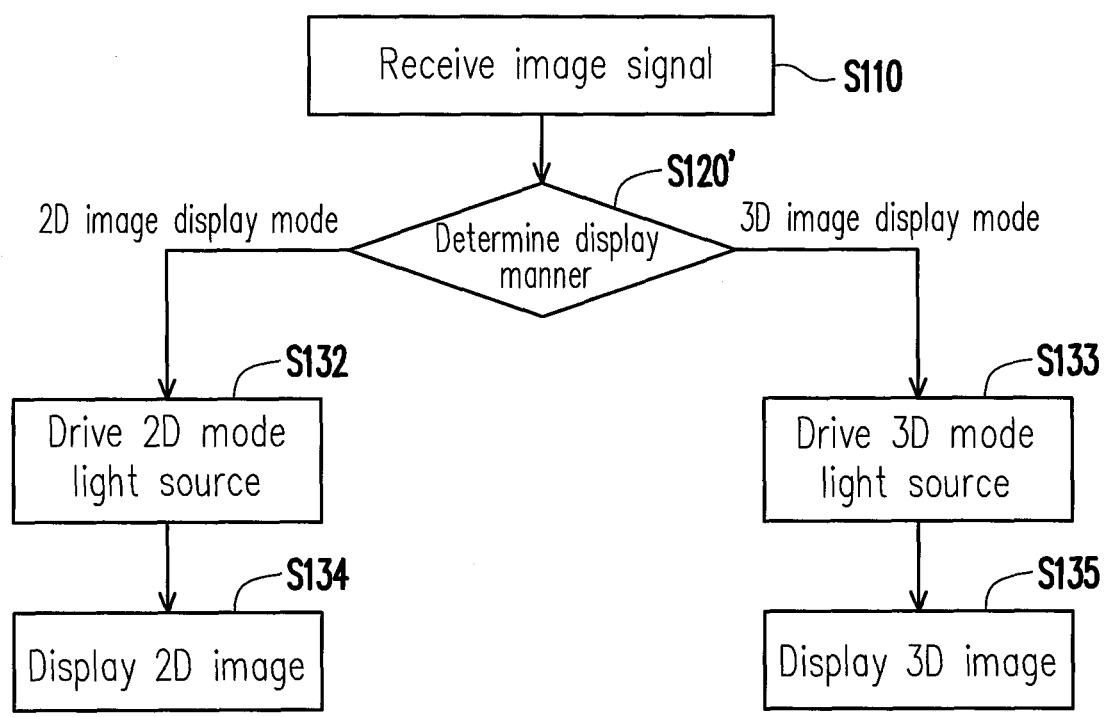
FIG. 14 is a flowchart illustrating a method for driving the light source module according to an embodiment of the invention.

FIG. 14 is a flowchart illustrating a method for driving the light source module according to an embodiment of the invention. Referring to FIG. 14, the method for driving the light source module 100 of the embodiment could be executed by the display apparatus 200b of FIG. 13. The method for driving the light source module 100 of the embodiment is similar to the method for driving the light source module 100 of FIG. 10, and differences there between are as follows. In the embodiment, in step S120', an image display mode is automatically determined and selected according to the image signal. When the 2D image display mode is selected, the step S132 is executed, by which the 2D mode light source is driven, and the display apparatus 200b displays the 2D image, as that shown in step S134. On the other hand, when the 3D image display mode is selected, the step S133 is executed, by which the 3D mode light source is driven, and the display apparatus 200b displays the 3D image, as that shown in step S135. In this way, by switching different modes of light source, switching of the 2D image display mode or the 3D image display mode is implemented, so that the switching speed between different image display modes is effectively increased.

In summary, the light source module, the display apparatus, and method for driving a light source module of the invention has at least one of following advantages. Based on configuration of the optical grating pattern and the wedge-shaped light guide plate, by switching different modes of light source, switching of the 2D image display mode or the 3D image display mode is implemented, so as to decrease the manufacturing cost of the light source module, improve a whole light output efficiency of the display apparatus and effectively increase a switching speed between different image display modes.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light source module, adapted to provide a first illumination beam to a display apparatus, wherein the display apparatus comprises a display panel configured to display a two-dimensional image or a three-dimensional image, and the light source module comprising:

a first wedge-shaped light guide plate, having a first light incident surface and a second light incident surface opposite to the first light incident surface, wherein the first wedge-shaped light guide plate further comprises an optical grating pattern, the optical grating pattern is formed on a surface of the first wedge-shaped light guide plate and functions as a parallax bather, and the surface is connected to the first light incident surface and the second light incident surface;

a first light emitting device, disposed beside the first light incident surface of the first wedge-shaped light guide plate;

a second light emitting device, disposed beside the second light incident surface of the first wedge-shaped light guide plate; and a light source driving module, adapted to turn on the first light emitting device for providing the first illumination beam to the first wedge-shaped light guide plate in a two-dimensional image display mode, and to turn on only the second light emitting device for providing the first illumination beam to the first wedge-shaped light guide plate in a three-dimensional image display mode, wherein widths of the first light incident surface and the second light incident surface of the first wedge-shaped light guide plate along a specific direction are respectively $S_{L1}$ and $S_{S1}$, wherein the width $S_{L1}$ is greater than the width $S_{S1}$.

2. The light source module as claimed in claim 1, wherein in the two-dimensional image display mode, the light source driving module is adapted to turn on the second light emitting device for providing the first illumination beam to the first wedge-shaped light guide plate.

3. The light source module as claimed in claim 1, wherein the widths $S_{L1}$ and $S_{S1}$ satisfy a condition of $1 < S_{L1}/S_{S1} \leq 10$.

4. The light source module as claimed in claim 1, wherein the optical grating pattern comprises a first light propagating region and a second light propagating region, the first light propagating region and the second light propagating region are straight bar-shaped regions and are arranged in interlace, and the second light propagating region has scattering microstructures.

5. The light source module as claimed in claim 1, further comprising a light reflecting device, wherein the first wedge-shaped light guide plate is disposed between the display panel and the light reflecting device, and the optical grating pattern is disposed on the surface of the first wedge-shaped light guide plate facing to the light reflecting device.

6. The light source module as claimed in claim 1, further comprising a light absorbing device, wherein the first wedge-shaped light guide plate is disposed between the display panel and the light absorbing device, and the optical grating pattern is disposed on the surface of the first wedge-shaped light guide plate facing to the display panel.

7. The light source module as claimed in claim 1, further comprising an optical film disposed between the display panel and the first wedge-shaped light guide plate, wherein the optical film comprises a prism surface facing to the first wedge-shaped light guide plate.

8. The light source module as claimed in claim 1, further comprising a planar light source device for providing a second illumination beam, wherein the first wedge-shaped light guide plate is disposed between the planar light source device and the display panel, and the planar light source device further comprises:

a second light guide plate, having a third light incident surface and a fourth surface opposite to the third light incident surface, wherein the first wedge-shaped light guide plate is disposed between the second light guide plate and the display panel; and a third light emitting device, disposed beside the third light incident surface of the second light guide plate, wherein in the two-dimensional image display mode, the light source driving module is adapted to turn on the third light emitting device for providing the second illumination beam to the second light guide plate.

9. The light source module as claimed in claim 8, wherein widths of the third light incident surface and the fourth surface of the second light guide plate along a specific direction are respectively $S_{L2}$ and $S_{S2}$, wherein the width $S_{L2}$ is greater than or equal to the width $S_{S2}$.

10. The light source module as claimed in claim 9, wherein the widths $S_{L2}$ and $S_{S2}$ satisfy a condition of $1 < S_{L2}/S_{S2} \leq 10$.

11. The light source module as claimed in claim 8, further comprising at least one optical film disposed between the first wedge-shaped light guide plate and the second light guide plate, wherein the at least one optical film comprises at least one of or all of an upper diffusion film, a lower diffusion film, and a brightness enhancement film.

12. The light source module as claimed in claim 11, further comprising a light absorbing device or a light reflecting device, wherein the second light guide plate is disposed between the at least one optical film and the light absorbing device or between the at least one optical film and the light reflecting device.

13. A display apparatus, comprising a light source module and a display module, wherein the display module comprises:

a mode switching module, configured to switch the display apparatus to a two-dimensional image display mode or a three-dimensional image display mode;

a light source driving module, connected to the mode switching module, and configured to drive the light source module to respectively provide a two-dimensional mode light source and a three-dimensional mode light source in the two-dimensional image display mode and the three-dimensional image display mode;

an image control module, connected to the mode switching module, and configured to drive the display module to respectively display a two-dimensional image or a three-dimensional image in the two-dimensional image display mode and the three-dimensional image display mode; and a display panel, configured to display the two-dimensional image or the three-dimensional image, wherein the light source module comprises a first light emitting device, a second light emitting device, and a first wedge-shaped light guide plate, the first wedge-shaped light guide plate comprises a first light incident surface and a second light incident surface opposite to the first light incident surface, and the first light emitting device and the second light emitting device are respectively disposed beside the first light incident surface and the second light incident surface, the first wedge-shaped light guide plate further comprises an optical grating pattern, wherein the optical grating pattern is formed on a surface of the first wedge-shaped light guide plate and functions as a parallax barrier, and the surface is connected to the first light incident surface and the second light incident surface, the light source driving module is configured to turn on the first light emitting device to serve as the two-dimensional mode light source for providing a first illumination beam to the first wedge-shaped light guide plate in the two-dimensional image display mode, and the light source driving module is configured to turn on only the second light emitting device to serve as the three-dimensional mode light source for providing the first illumination beam to the first wedge-shaped light guide plate in the three-dimensional image display mode, wherein widths of the first light incident surface and the second light incident surface of the first wedge-shaped light guide plate along a specific direction are respectively $S_{L1}$ and $S_{S1}$, wherein the width $S_{L1}$ is greater than the width $S_{S1}$.

14. The display apparatus as claimed in claim 13, wherein in the two-dimensional image display mode, the light source driving module controls to turn on the second light emitting device to serve as the two-dimensional mode light source for providing the first illumination beam to the first wedge-shaped light guide plate.

15. The display apparatus as claimed in claim 13, wherein the widths $S_{L1}$ and $S_{S1}$ satisfy a condition of $1<S_{L1}/S_{S1}\leq 10$.

16. The display apparatus as claimed in claim 13, wherein the optical grating pattern comprises a first light propagating region and a second light propagating region, the first light propagating region and the second light propagating region are straight bar-shaped regions and are arranged in interlace, and the second light propagating region has scattering microstructures.

17. The display apparatus as claimed in claim 13, further comprising a light reflecting device, wherein the first wedge-shaped light guide plate is disposed between the display panel and the light reflecting device, and the optical grating pattern is disposed on the surface of the first wedge-shaped light guide plate facing to the light reflecting device.

18. The display apparatus as claimed in claim 13, further comprising a light absorbing device, wherein the first wedge-shaped light guide plate is disposed between the display panel and the light absorbing device, and the optical grating pattern is disposed on the surface of the first wedge-shaped light guide plate facing to the display panel.

19. The display apparatus as claimed in claim 13, further comprising an optical film disposed between the display panel and the first wedge-shaped light guide plate, wherein the optical film comprises a prism surface facing to the first wedge-shaped light guide plate.

20. The display apparatus as claimed in claim 13, further comprising a planar light source device for providing a second illumination beam, wherein the first wedge-shaped light guide plate is disposed between the planar light source device and the display panel, and the planar light source device further comprises a second light guide plate and a third light emitting device, the second light guide plate has a third light incident surface and a fourth surface opposite to the third light incident surface, the third light emitting device is disposed beside the third light incident surface of the second light guide plate, and the first wedge-shaped light guide plate is disposed between the second light guide plate and the display panel, the light source driving module controls to turn on the third light emitting device for providing the second illumination beam to the second light guide plate in the two-dimensional image display mode.

21. The display apparatus as claimed in claim 20, wherein widths of the third light incident surface and the fourth surface of the second light guide plate along the specific direction are respectively $S_{L2}$ and $S_{S2}$, wherein the width $S_{L2}$ is greater than or equal to the width $S_{S2}$.

22. The display apparatus as claimed in claim 21, wherein the widths $S_{L2}$ and $S_{S2}$ satisfy a condition of $1<S_{L2}/S_{S2}\leq 10$.

23. The display apparatus as claimed in claim 20, further comprising at least one optical film disposed between the first wedge-shaped light guide plate and the second light guide plate, wherein the at least one optical film comprises at least one of or all of an upper diffusion film, a lower diffusion film, and a brightness enhancement film.

24. The display apparatus as claimed in claim 23, further comprising a light absorbing device or a light reflecting device, wherein the second light guide plate is disposed between the at least one optical film and the light absorbing device or between the at least one optical film and the light reflecting device.

25. A method for driving a light source module, wherein the light source module is configured to provide a first illumination beam to a display apparatus, and the display apparatus is operated in a two-dimensional image display mode or a three-dimensional image display mode, the method for driving the light source module comprising:
switching the light source module to the two-dimensional image display mode or the three-dimensional image display mode according to an image signal received by the display apparatus, wherein the light source module comprises a first light emitting device, a second light emitting device, and a first wedge-shaped light guide plate, the first wedge-shaped light guide plate comprises a first light incident surface and a second light incident surface opposite to the first light incident surface, and the first light emitting device and the second light emitting device are respectively disposed beside the first light incident surface and the second light incident surface, the first wedge-shaped light guide plate further comprises an optical grating pattern, wherein the optical grating pattern is formed on a surface of the first wedge-shaped light guide plate and functions as a parallax barrier, and the surface is connected to the first light incident surface and the second light incident surface, wherein widths of the first light incident surface and the second light incident surface of the first wedge-shaped light guide plate along a specific direction are respectively $S_{L1}$ and $S_{S1}$, wherein the width $S_{L1}$ is greater than the width $S_{S1}$;
turning on the first light emitting device to serve as a two-dimensional mode light source for providing the first illumination beam to the first wedge-shaped light guide plate in the two-dimensional image display mode, wherein the display apparatus displays a two-dimensional image in the two-dimensional image display mode; and
turning on only the second light emitting device to serve as a three-dimensional mode light source for providing the first illumination beam to the first wedge-shaped light guide plate in the three-dimensional image display mode, wherein the display apparatus displays a three-dimensional image in the three-dimensional image display mode.

26. The method for driving the light source module as claimed in claim 25, further comprising:
turning on the second light emitting device to serve as the two-dimensional mode light source for providing the first illumination beam to the first wedge-shaped light guide plate.

27. The method for driving the light source module as claimed in claim 25, wherein the light source module further comprises a second light guide plate and a third light emitting device, the third light emitting device is disposed beside a third light incident surface of the second light guide plate, and the method for driving the light source module further comprises:

turning on the third light emitting device in the two-dimensional image display mode to serve as the two-dimensional mode light source for providing a second illumination beam to the second wedge-shaped light guide plate.

\* \* \* \* \*